V. DANIELS.
CULTIVATOR SHOVEL.
APPLICATION FILED MAR. 9, 1918.
1,267,518.
Patented May 28, 1918.
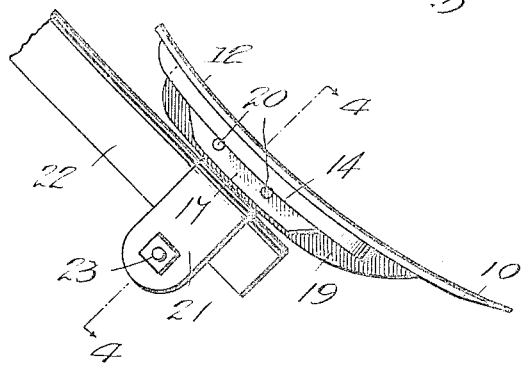
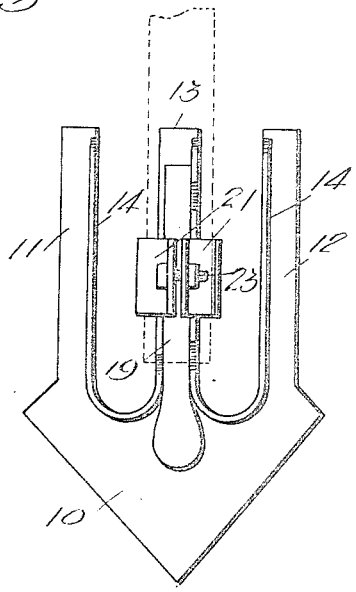
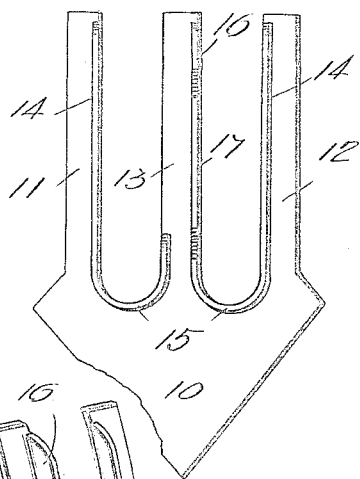
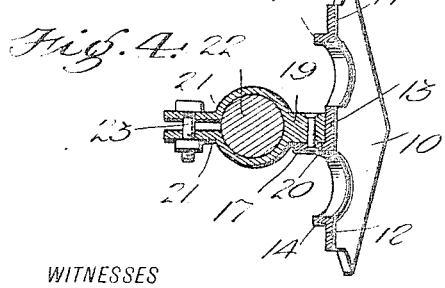
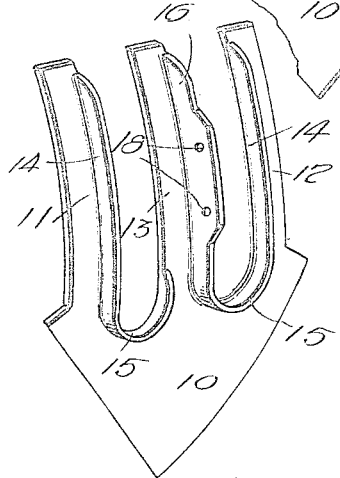
WITNESSES
H. Woodard
Myron T. Clear
INVENTOR
V. Daniels
BY Munn & Co.
ATTORNEYS

UNITED STATES PATENT OFFICE.

VALENTINE DANIELS, OF GENESEO, ILLINOIS.

CULTIVATOR-SHOVEL.

1,267,518.  Specification of Letters Patent.  Patented May 28, 1918.

Application filed March 9, 1918. Serial No. 221,465.

*To all whom it may concern:*

Be it known that I, VALENTINE DANIELS, a citizen of the United States, and a resident of Geneseo, in the county of Henry and State of Illinois, have made certain new and useful Improvements in Cultivator-Shovels, of which the following is a specification.

My present invention relates generally to ground working implements, and more particularly to cultivator shovels, my object being the provision of a shovel constructed in such manner as to allow for free passage and clearance of the broken soil, and one which will at the same time be extremely strong and durable in spite of its divided upper portion, which carries out the first object above mentioned.

In scouring soil in cultivating operations, it is a primary consideration to have the least shovel surface possible in providing for greater ground clearance, and allowing for its operation with the least possible pull under the circumstances.

A still further object of my invention is the provision of effective connecting means between the upper divided portion of the shovel and cultivator beam and the like to which the shovel is attached.

In the accompanying drawing, illustrating my present invention:—

Figure 1 is a side view illustrating the shovel attached to a cultivator beam;

Fig. 2 is a rear elevation of the parts shown in Fig. 1;

Fig. 3 is a rear elevation of the shovel removed, and with the beam attaching means disconnected;

Fig. 4 is a sectional view taken substantially on line 4—4 of Fig. 1, and,

Fig. 5 is a rear perspective view of the shovel with the beam attaching means disconnected.

Referring now to these figures, my invention proposes a cultivator shovel, the body of which includes a lower substantially triangular blade 10 and an upper shank, the latter of which has parallel longitudinally slotted openings through its upper end forming spaced parallel prongs, including side prongs 11 and 12, and a central prong 13, it being noted from Fig. 1 that the entire body of the shovel is concaved from the tip of its blade 10 to the upper end of the shank, without side drift or tilt to obtain maximum results in operation.

It will be noted from Figs. 2 and 3 in particular that the slots of the shank are relatively wider than the remaining portions thereof, the prongs 11, 12 and 13, the latter being preferably as narrow as possible under the circumstances and retain the necessary strength assisted by flanges extending lengthwise therealong. The outer prongs 11 and 12 have flanges 14 along their inner edges integral with flanges 15 rounding the lower inner ends of the shank slots so as to effectively stiffen and strengthen these prongs. The flange 14 of the prong 12 is joined moreover by means of the flange 15, with a flange 16 extending along one side of the central prong 13, and having an enlarged portion 17 intermediate its ends, which is apertured as at 18 for a purpose to be presently described.

It will be noted that these flanges 14, 15 and 16 may be formed from the waste material stamped from the shank in the formation of the slots between the prongs, and that while serving as above stated, to stiffen and strengthen the prongs, they do not in any way endanger clogging or obviate free clearness or passage of the earth through the slots.

The flange 16 of the central prong 13 furthermore provides anchorage for the beam attaching means, the latter in the form of a bracket 19 extending vertically along the rear face of the central prong 13 and secured by laterally extending fastening members 20 projecting through the apertures 18 of the flange 16. These fastening members may be of various description, although preferably in the nature of rivets, the heads of which will be counter-sunk so as to avoid projections, rough edges and the like, which might cause clogging in use.

Bracket 19 has spaced clamping arms 21 projecting rearwardly from a point intermediate its ends, portions of which are curved to embrace a cultivator beam such as 22 in Fig. 1, a clamping bolt 23 connecting the extremities of these arm 21, so as to provide for their effective adjustable engagement with the cultivator beam.

It is obvious, therefore, that the shovel constructed in accordance with my invention, while presenting a smooth working face, and a body portion apertured to provide for free clearance of the soil, is effectively braced and strengthened not only by the stiffening flanges 14, 15 and 16, but by the attaching bracket 19, without adding to the minimum area of surface presented, and without undesirably affecting the other features thereof, or its efficient use.

I claim:—

1. A cultivator shovel having its body provided with a lower solid blade portion and with slots extending downwardly from its upper end to a point adjacent the blade portion forming spaced prongs, said blade portion and said prongs being curved from end to end of the body and each of said prongs being provided with a rearwardly presented flange along one side thereof to reinforce the same and retain its shape.

2. A cultivator shovel having its body provided with a lower solid blade portion and with slots extending downwardly from its upper end to a point adjacent the blade portion forming spaced prongs, said blade and said prongs being uniformly curved and each of said prongs being provided with a rearwardly presented flange along one side thereof, said body also having flanges around the inner ends of its said slots, and in connection with the flanges of the said prongs, for the purpose described.

3. A cultivator shovel having a lower blade and a plurality of upwardly projecting spaced prongs extending from the upper portion of the blade, each of said prongs having reinforcing means and having a surface curvature corresponding to the curvature of the blade, for the purpose described.

4. A cultivator shovel having a lower approximately triangular blade, and prongs including a central and side prongs projecting upwardly from the blade, and having rearwardly presented flanges, a bracket extending along the rear face of the central prong and secured to the flange thereof, and clamping arms extending rearwardly from the said bracket, and a clamping bolt connecting the rear extremities of the said clamping arms, for the purpose described.

VALENTINE DANIELS.

Witnesses:
E. CURTIS BATTEN,
JOHN A. McKIBBON.